EXTREMELY LOW BRIGHTNESS CONTRAST AS IN CALIBRATION

CALIBRATED AS PER K=0.33

CALIBRATED AS PER K=1.32

ORDINARY BRIGHTNESS CONTRAST AS IN FAIR-LIGHT PHOTOGRAPHING

CONSIDERABLE HIGH BRIGHTNESS CONTRAST AS IN COUNTER-LIGHT PHOTOGRAPHING

3,428,403
PHOTOELECTRIC EXPOSURE METER HAVING A SEGMENTED PHOTORESISTOR FOR SUBJECTS OF VARYING BRIGHTNESS

Masaichiro Konishi, Nishinomiya, Japan, assignor to Minolta Camera Kabushiki Kaisha, Osaka, Japan, a corporation of Japan
Filed Jan. 4, 1966, Ser. No. 518,654
U.S. Cl. 356—222
Int. Cl. G01j 1/42
4 Claims

ABSTRACT OF THE DISCLOSURE

A photoelectric exposure meter in which a plurality of photoelectric components are connected in series with an electrical source through a coil moving instrument to receive light from respective divided portions of a field via an optical focussing system, which divides the light.

---

Figure 1:
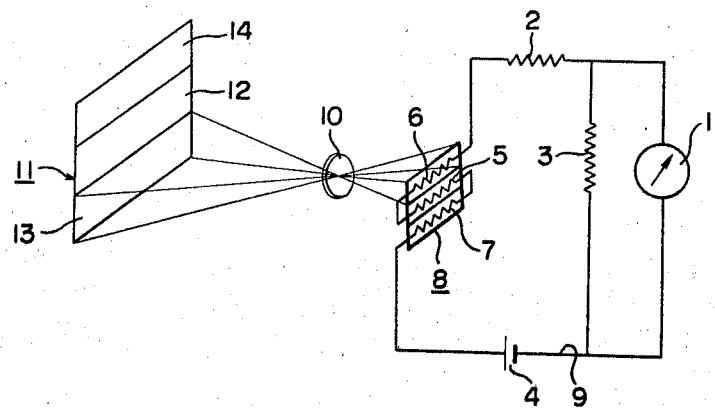

The present invention relates to a photoelectric exposure meter and more particularly to such meter being adapted to obtain satisfactory results by placing importance especially on measurements of lower brightness part existing everywhere in the field to be photographed so as to avoid undesirable excessive influences from higher brightness parts therein, which is based on an idea fundamentally distinct from that of conventional exposure meters as described in the Japanese Industrial Standard (JIS), DIN and the like.

Hitherto, usual photoelectric exposure meters are of so-called average brightness type whereby arithmetical mean value which has been obtained by measuring various brightnesses involved in the field to be measured is used as resultant value. With such exposure meters, however, it is inevitable to result in considerably insufficient exposure when the brightness distribution is not homogeneous or the contrast between light and shade or brightness contrast on the subject is noticeable and when incident light from outside of the main object is abundant as in counter-light photographing, although the satisfiable result may be obtained under the condition wherein the brightness contrast is moderate or brightness distribution is not so markedly scattered as in fair-light photographing. Even under the undesirable condition as referred to first, there are some solutions to avoid such unsatisfiable result to some extent if a portable exposure meter which is not incorporated in the camera body is available, for instance approaching to the main object to measure only the brightness thereon, slanting the meter downwards to the ground to collect the light possibly corresponding to that on the main object and the like. Such correction will not be expected, however, in case where so-called EE camera is used or quick photographing is required or the user is lack of knowledge to take such a matter into consideration.

Various solutions have been offered in order to avoid and overcome the faults as referred to above, among of which are a method whereby an excess electric current generated at counterlight photographing is diverted to eliminate by connecting a photoconductive element of wide light acceptance angle in parallel with a photovoltaic element of such light acceptance field as corresponding to the shooting angle, and a method wherein two photoelectric elements are connected in a series with a measuring mecahnism, one of said elements being adapated to receive light reflected from all over the subject while the other is adapted to accept light merely from the relatively dark portion so as to neglect the influence of the high brightness portions. In these prior arts have been utilized not only light from the field to be photographed but also that reflected from outside of said field as axiliary light for the purpose of making correction. The light from outside of the field to be photographed, however, has no theoretical relationship with that from inside thereof for the purpose of obtaining the suitable exposure. Accordingly it is obviously difficult to increase the probability for attaining that purpose by any of the prior arts.

Thus, it is an object of this invention to obtain the appropriate exposure value by measuring light reflected merely from the field to be photographed wherein the field to be measured is made coincident with or correspond to that to be photographed.

The object is attained in accordance with the present invention by providing an optical focussing system and a plurality of photoelectric units which are arranged so that each of them may be sensitive to the light through said optical system from each of the correspondingly divided portions of the field to be photographed and consequently to be measured, and which are electrically connected in series whereby the light from high brightness portion of the subject may not adversely affect that purpose.

Said field may be divided into a plurality of portions correspondingly to the number of said photoelectric units either by locating the light receiving faces of such elements at the focus of said optical system or by locating the light diffusion means at said focus in the rear of which are placed said photoelectric units.

Figure 2:
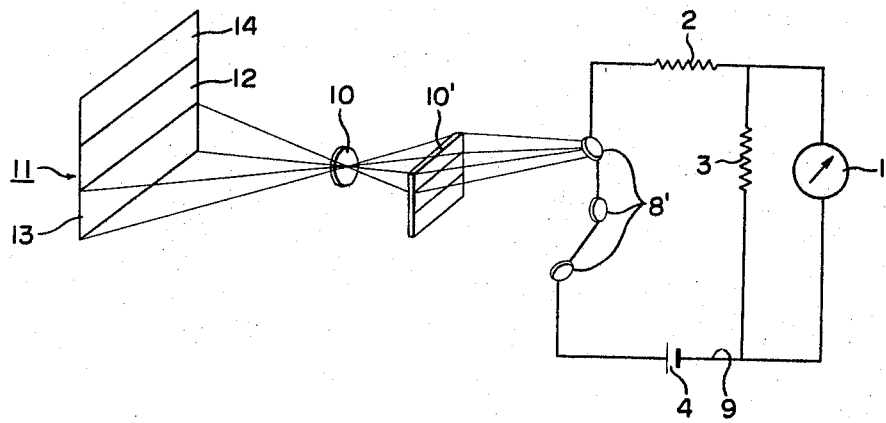
Figure 3:
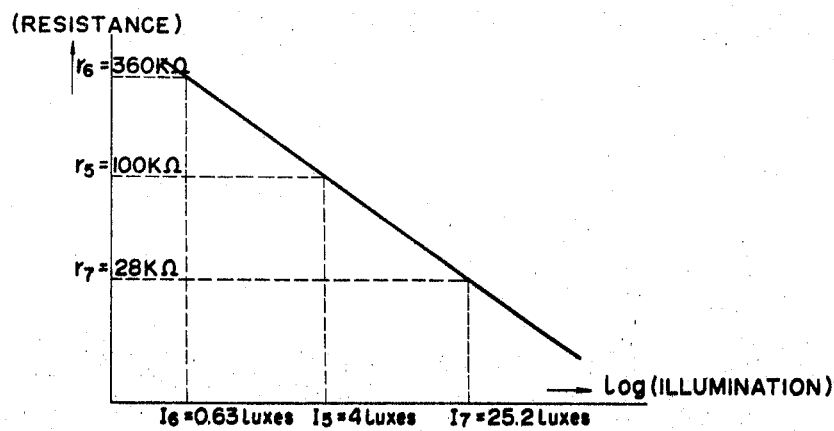
Figure 4:
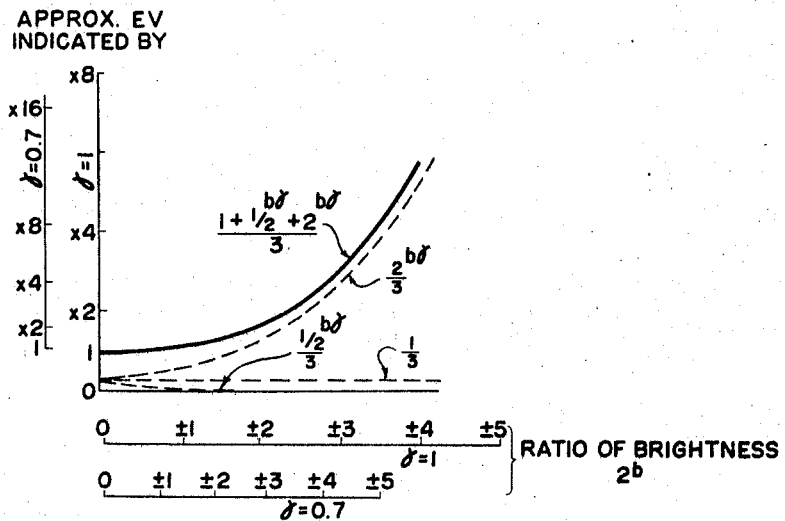
Figure 5A:
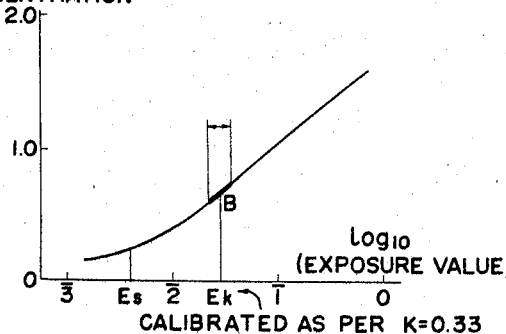
Figure 5D:
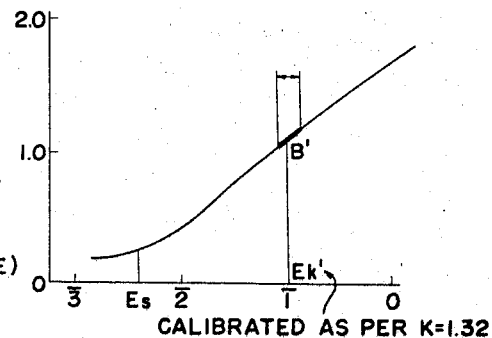
Figure 5B:
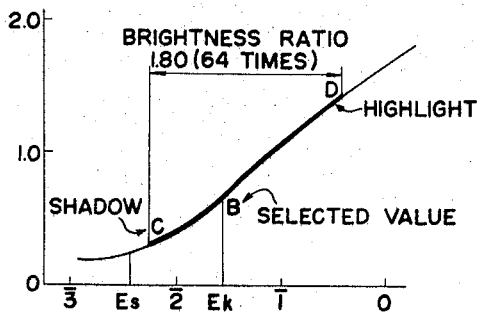
Figure 5E:
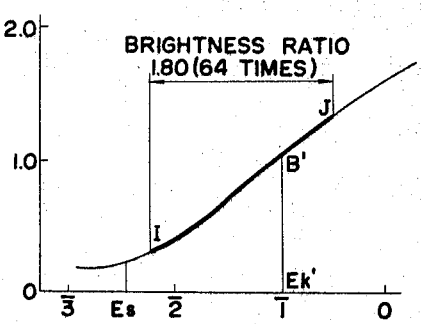
Figure 5C:
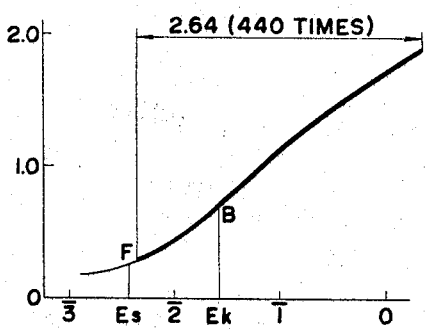
Figure 5F:
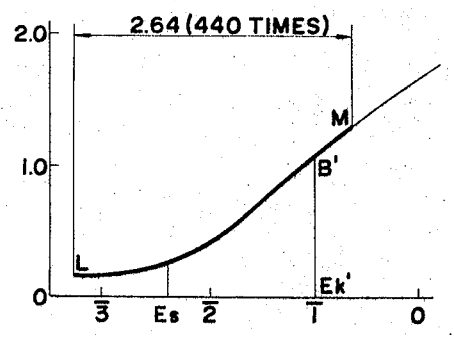

The present invention shall be described in more detail in reference with the accompanying drawings, in which:

FIG. 1 is circuit diagram as well as light acceptance passage system of the electric exposure meter in accordance with the present invention, FIG. 2 is a similar view of another embodiment of this invention in which the light diffusion means are inserted between the optical focussing system and the photoelectric means, FIGS. 3 and 4 are diagrams respectively showing modes of operation of the circuit, and FIGS. 5(a)–(f) are diagrams respectively showing the effect of the present invention.

Referring now to FIGS. 1 and 2, there are provided in the electric circuit 9 a meter 1, compensating resistors 2 and 3, an electric source 4, one pole of said electric source 4 being connected to said resistor 2 through the photoelectric means. In FIG. 1 the photoelectric means comprises a light sensitive cell 8 consisting of three photoelectric elements 5, 6 and 7 connected in series. In front of the cell 8 is provided a lens 10 which serves to project an image of the field to be photographed 11 on the light receiving surface of said cell 8 so that the middle part 12 of said field 11 is projected on the element 5, and the lower and upper parts 13, 14 respectively on the upper and lower elements 6, 7. It will be understood that the cell is to be located at the focus of the lens 10 or the vicinity thereof. There may be provided two, four, five or more elements and thus the field to be photographed may be divided into corresponding number of parts. In FIG. 2, the electric circuit is the same as that of FIG. 1 except that the photoelectric means comprise a plurality of cells 8', three cells in this embodiment, which are connected in series and a diffusion glass or focussing screen 10' is provided at the focus of the lens 10 or the vicinity thereof so that each light from three parts of the photographed field may be projected correspondingly on said three cells through the diffusion means 10'.

The calibration formula as prescribed in the JIS Standard, ASA Standard and the like is as follows;

$$2^{EV} = \frac{A^2}{T} = \frac{B \cdot S}{K} \qquad (1)$$

wherein:

EV: Exposure value, e.g. 6
A: Aperture, e.g. 2
T: Shutter speed, e.g. 1/16 (sec.)
B: Brightness of subject, e.g. 0.38 (candle/ft.$^2$)
S: Sensitivity of film, e.g. 100
K: Calibration constant, e.g. 0.6

Although in the JIS Standard said constant K is prescribed as 1 to 1.35 and in the USA Standard as 0.9 to 1.22, the constant 0.6 is adopted in the present invention as referred to above.

Now suppose that CdS is used as the light sensitive cell which has an illumination-resistance characteristic as shown in FIG. 3 wherein the resistance is 100K when the CdS cell is illuminated at 4 luxes and the grade $\gamma$ is 0.7. When the distribution of brightness on the subject is not homogeneous and consequently the photoelectric elements 5, 6 and 7 are differently illuminated respectively at $I_5$, $I_6$ and $I_7$ luxes;

Brightness ratio: $2^b$, e.g. $2^{2.64}$
$I_5$, e.g. 4 luxes
$I_6 = I_5 \times \frac{1}{2}^b$, e.g. $4 \times \frac{1}{2}^{2.64} = 0.63$ luxes
$I_7 = I_5 \times 2^b$, e.g. $4 \times 2^{2.64} = 25.2$ luxes then resistance $r_5$, $r_6$ and $r_7$ respectively of the photoelectric elements 5, 6 and 7 are to be in accordance with said characteristic;

$r_5$, e.g. 100 KΩ
$r_6 = r_5 \times \frac{1}{2}^{b\gamma}$, e.g. $100 \times \frac{1}{2}^{2.64 \times 0.7} = 28$ KΩ
$r_7 = r_5 \times 2^{b\gamma}$, e.g. $100 \times 2^{2.64 \times 0.7} = 360$ KΩ

As the photoelectric elements 5, 6 and 7 are connected in series, the resultant resistance R is to be;

$$R = r_5 + r_6 + r_7 = r_5(1 + \frac{1}{2}^{b\gamma} + 2^{b\gamma}) \quad (2)$$

e.g.
$= 100 + 28 + 360 = 488$ KΩ
$= 100(1 + \frac{1}{3}.6 + 3.6)$
$= 100 \times 4.88$ On the other hand, as the calibration is carried out so that each of the photoelectric elements 5, 6 and 7 may be illuminated at an equal illumination of $I_5$, the resultant resistance $R'$ is to be;

$$R' = 3r_5 \quad (3)$$

e.g.
$= 300$ KΩ $= 100 \times 3$

This means that when the brightness on the subject is uniformly 0.38 Cd/feet$^2$ the illumination on the light sensing elements is 4 luxes and that under 300KΩ resultant resistance the film sensibility is 100, stop value 2 and shutter speed 1/16.

Then resultant resistance R under the condition wherein the brightness distribution is not homogeneous, is divided by the resultant resistance $R'$ under the condition wherein the brightness distribution is homogeneous which is same with the mean brightness in the former case;

(2) ÷ (3)

$$\frac{R}{R'} = \frac{1 + 1/2^{b\gamma} + 2^{b\gamma}}{3}$$

e.g.

$$= \frac{1 + 1/3.6 + 3.6}{3} = 1.63$$

When this resistance ratio is converted into the exposure value ratio in consideration of the value of:

$$\text{Exposure value ratio} = \left(\frac{1 + 1/2^{b\gamma} + 2^{b\gamma}}{3}\right)^{1/\gamma}$$

e.g. $= 1.63^{1/0.7} = 2.01$

Shutter speed, $1/16 \times 2.01 = 1/8$

This means that when the brightness distribution is not homogeneous even if the geometric median brightness is same as that in the case where the distribution is homogeneous, the exposure meter according to the present invention indicates more exposure value with giving the shutter speed as 1/8. Namely with this invention it is possible to obtain more exposure value in case of the heterogeneous brightness distribution as if the brightness on the photographed field as a whole were darker than the median brightness as $$\frac{1}{\left(\frac{1 + 1/2^{b\gamma} + 2^{b\gamma}}{3}\right)^{1/\gamma}}$$

or in other words as if the calibration constant K were multiplied by $$\left(\frac{1 + 1/2^{b\gamma} + 2^{b\gamma}}{3}\right)^{1/\gamma}$$

e.g. $0.6 \times 2.01 = 1.2$. This correction is progressibly enlarged depending on the increase of the brightness as shown in FIG. 4.

The simplest instance has been explained but it will be obvious without further elaborate expositions that quite satisfactory results can be obtained in accordance with the present invention even if the number of the photoelectric elements is not three, the characteristics thereof are different with each one another, the characteristic is not linear, the brightness are not in the manner of geometric progression or the system of FIG. 2 is used instead of that as illustrated in connection with FIG. 1.

It will be understood by studying FIG. 5 how far the exposure meter would contribute to obtaining suitable exposure value in the case where the brightness distribution is considerably heterogeneous or brightness contrast is noticeable, according to the present invention which correspondingly enlarged exposure value. In the graphs, so-called film characteristic curves as FIGS. 5 (a)–(f), the logarithm of exposure value is taken on the abscissa while the darkening density of the film or the logarithm of the reciprocal of permeability on the ordinate. $Es$ on the abscissa is a point where the grade is 0.3 and a limit point showing that the difference of exposure (lux × second) can be correctly converted into the difference of density on the curve portion in the right hand from said limit point, $Ek$ on the abscissa is a point to be specified depending on the value of the calibration constant K. The corresponding point B on the curve is to designate a value selected by the each exposure meter circuit, which shall be called "selected value" hereinafter, between the highest brightness and the lowest one in the subject. In the left column of FIG. 5, namely FIGS. 5(a), 5(b) and 5(c) is designated as a thickened portion along the curve a utilized range of film density when photographed complying with indication of the exposure meter according to the present invention, while in FIGS. 5(d), 5(e) and 5(f) in the right column the thickened portion of the curve shows such range when photographed in accordance with the usual exposure meter. Two figures on the upper row, FIGS. 5(a) and 5(d) are of the case where the ratio of highest brightness to lowest one in the subject which shall be called "brightness ratio" herein is considerably lower as when being calibrated. In FIG. 5(a) it is seen that the relatively lower range of film density is utilized since the constant K is selected lower. FIGS. 5(b) and 5(e) in the middle row are of the case wherein the subject has ordinary brightness ratio as in fairlight photographing. In FIG. 5(b) the brightness distribution ranges from lower point C to higher point D. Although said point B is closer to the point C, the film density utilizing range as a whole is substantially same with that in FIG. 5(e) since the point $Ek$ on the abscissa corresponding to the point B on the curve is of lower value as referred to above. FIGS. 5(c) and 5(f) is of the case where the brightness contrast between shadow or lower brightness point F to highlight or higher brightness point H is noticeable in the subject as in counter-light photographing. In FIG. 5(c) since the selected value B is closer to the lower brightness point F which will not beyond the point Es and that the higher brightness point H will not be put aside so far in the right hand along the curve, while in FIG. 5(f) the shadow point L will be shifted beyond the point E even if the point Ek, on the abscissa corresponding to the point B' on the curve is taken as of the relatively higher value since the selected value B' lies closer to the highlight point M. This means that when the subject having the wide range of brightness distribution and consequently noticeable brightness contrast is to be photographed and consequently to be measured in accordance with the usual exposure meter, the given indication is adversely influenced by the high brightness part in the subject so that the main object portion is underexposed and such disadvantage has been overcome by the present invention as seen in FIG. 5(c).

On actually applying the photoelectric exposure meter, it is necessary to specify the value of the constant K depending on the number and manner of dividing the field to be photographed through a number of experiments so as to promote the possibility to give more suitable exposure value for various subjects and under various light conditions.

If the number of dividing the photographed field and consequently of the photoelectric elements is less it is preferable to set the value of the constant K closer to the range of 1–1.35 as in the usual average brightness method and such value should be less depending on increase of the division number.

It has been found that 0.5 is preferable in case of dividing into five parts and 0.33 for dividing into seven.

Since the present invention is esentially lies in limiting the field to be measured to that to be photographed and dividing same into a plurality of portions with use of an focussing optical system in front of the photoelectric means, it will be more easily adapted to and more effectively used for the through-the-lens type of monocular reflex camera althrough not exclusively.

What is claimed is:

1. Photoelectric exposure apparatus for automatically indicating suitable exposure values, said apparatus comprising an optical focussing system for projecting an image of the field to be photographed in a plurality of divided portions, and photoelectric means for receiving the images from said portions to provide an exposure value indicative of the brightness of the image, said photoelectric means comprising a plurality of photoelectric components, an electric source, and a coil moving instrument, said photoelectric components being connected in series with said source and instrument, said photoelectric components being positioned in the vicinity of the focus of the optical system such that said components receive light from respective divided portions of the field to be photographed whereby the light from high brightness portions of the subject will not adversely affect the value of suitable exposure, the value of the constant K in the following exposure meter calibration formula being less than 0.6;

$$2^{EV} = \frac{A^2}{T} = \frac{B \cdot S}{K}$$

wherein EV is exposure value, A is aperture, T is shutter speed, B is subject brightness and S is film sensitivity.

2. Apparatus as claimed in claim 1 wherein said optical system comprises a lens and said plurality of photoelectric components form a single light sensitive cell which is located at the focus of said lens.

3. Apparatus as claimed in claim 1 wherein said optical system comprises a lens and a light diffusion means located at the focus of said lens, said plurality of photoelectric components being located at the rear of said diffusion means so that the light from the field is projected as divided portions on corresponding photoelectric components.

4. Apparatus as claimed in claim 1 wherein the value of the constant K is within the range of from 0.33 to 0.6.

References Cited

UNITED STATES PATENTS

| | | |
|---|---|---|
| 2,222,788 | 11/1940 | Touceda et al. ____ 250—212 X |
| 2,233,879 | 3/1941 | Tolman _____ 250—212 X |
| 2,482,980 | 9/1949 | Kallmann _____ 250—211 X |
| 2,849,520 | 8/1958 | Picciano _____ 250—208 X |
| 3,028,499 | 4/1962 | Farrall _____ 250—209 |
| 3,096,441 | 7/1963 | Burkhardt _____ 250—209 |
| 3,274,914 | 9/1966 | Biedermann et al. __ 250—209 X |
| 3,351,768 | 11/1967 | Cooke _____ 250—209 |
| 2,641,712 | 6/1953 | Kircher _____ 250—209 X |
| 3,024,695 | 3/1962 | Nisbit _____ 88—23 |
| 3,225,646 | 12/1965 | Nagai _____ 88—23 |
| 3,351,768 | 11/1967 | Cooke _____ 250—209 X |

FOREIGN PATENTS 407,309   6/1932   Great Britain.

JAMES W. LAWRENCE, *Primary Examiner.*

C. R. CAMPBELL, *Assistant Examiner.*

U.S. Cl. X.R.

25—209; 338—17; 356—225